United States Patent [19]

Honda

[11] Patent Number: 4,987,840
[45] Date of Patent: Jan. 29, 1991

[54] INCINERATOR WITH HIGH COMBUSTION RATE

[75] Inventor: Yoji Honda, Tokyo, Japan

[73] Assignee: Kiyoharu Michimae, Toyama, Japan

[21] Appl. No.: 193,187

[22] Filed: May 10, 1988

Related U.S. Application Data

[63] Continuation of Ser. No. 17,043, Feb. 19, 1987, abandoned.

[30] Foreign Application Priority Data

Feb. 27, 1986 [JP] Japan ................... 61-040342

[51] Int. Cl.⁵ ............................................. F23G 5/00
[52] U.S. Cl. .................................. 110/245; 432/58; 110/255; 110/259
[58] Field of Search ............ 110/245, 203, 210, 235, 110/254, 255, 256–259; 432/15, 58

[56] References Cited

U.S. PATENT DOCUMENTS

| | | | |
|---|---|---|---|
| 3,515,381 | 6/1970 | Foch | 432/15 |
| 3,958,518 | 5/1976 | Yoshida | 110/259 X |
| 4,091,747 | 5/1978 | Chase | 110/210 |
| 4,128,392 | 12/1978 | Tock | 432/58 |
| 4,306,506 | 12/1981 | Rotter | 110/255 X |
| 4,321,877 | 3/1982 | Schmidt et al. | 110/255 X |
| 4,334,484 | 6/1982 | Payne et al. | 110/203 X |
| 4,336,227 | 6/1982 | Koyama et al. | 432/58 |
| 4,346,661 | 8/1962 | Nakamura | 110/259 |
| 4,480,392 | 11/1984 | Luthi | 432/58 |
| 4,506,608 | 3/1985 | Strohmeyer, Jr. | 110/245 |
| 4,682,948 | 7/1987 | Cohen | 432/58 |
| 4,693,682 | 9/1987 | Lee et al. | 432/15 |
| 4,773,339 | 9/1988 | Garcia-Mallol | 110/245 |

FOREIGN PATENT DOCUMENTS 61-58724 11/1979 Japan.
56-92993 7/1981 Japan.
60-17398 5/1985 Japan.

*Primary Examiner*—Henry C. Yuen
*Attorney, Agent, or Firm*—McAulay Fisher Nissen & Goldberg

[57] ABSTRACT

An incinerator has a furnace body whose height is 1.5–10 times the average internal diameter thereof. A combustion chamber is included which is formed by providing a plurality of air blast ports in a lower side wall and/or bank in the furnace body. A gas exhaust port is provided in the upper side of the combustion chamber and the side wall of the upper portion of the furnace body. A duct is included for leading an exhaust gas from the exhaust port to a place for making secondary use thereof.

3 Claims, 1 Drawing Sheet

INCINERATOR WITH HIGH COMBUSTION RATE

This is a continuation of application Ser. No. 017,043, filed Feb. 19, 1987, abandoned.

FIELD OF THE INVENTION

The present invention relates to an incinerator and particularly to one which is capable of burning, without effecting pretreatment, wood chips, bark, textile wastes, synthetic resin products, and the like, as well as a mixture thereof, which have large variations in the moisture content due to water absorbing properties thereof, or solid wastes in which nonflammable metallic product wastes are mixed, and which makes it possible to make effective use of the exhaust gas thereof secondarily.

BACKGROUND OF THE PRIOR ART

Since objects to be incinerated such as wood chips, bark, textile wastes, rice hulls, and scrap paper have large water-absorbing properties, their variations in the moisture content are largely depending on seasons, the weather conditions, and the like, so that it has been difficult to completely burn out objects to be incinerated which have different water contents in an incinerator of a definite construction.

As for incinerators, for instance, multi-stage furnaces have generally been used for sewage sludge having a low heating value; stoker furnaces for objects to be incinerated with a heating value of 1,000 kcal/kg or above; and stationary hearth furnaces of small-scale designed for objects to be incinerated with a heating value of 4,000 kcal/kg or above.

However, conventional incinerators have drawbacks, respectively, and, for instance, multi-stage furnaces have particularly weak points with respect to variations in the properties of objects to be incinerated; stoker furnaces with respect to synthetic resin products; and stationary hearth furnaces with respect to objects to be incinerated having a large ash content. These incinerators also have common weak points with respect to variations in the water content and to objects to be incinerated in which nonflammable or flame-resisting objects are mixed.

In addition, it has been difficult for conventional incinerators to completely burn out objects to be incinerated having large water contents unless auxiliary fuel is used. Furthermore, since a combustion exhaust gas is released as it is to the air via a flue, conventional incinerators are not provided with means for making effective use of the exhaust gas secondarily.

SUMMARY OF THE INVENTION

The present invention has been devised in view of the above, and an object of the invention is to provide an incinerator which is capable of sufficiently coping with variations in the moisture content and heating value of objects to be incinerated and nonflammable and flame-resisting objects mixed therein, has a combustion rate equivalent to that of an inclined backward feed stoker type furnace having an extremely high combustion efficiency, and makes a positive use of a generated exhaust gas secondarily.

In accordance with the present invention, an incinerator comprises a charging hopper, a furnace whose height is 1.5-10 times an average internal diameter thereof, a combustion chamber having a plurality of air blast ports in a lower side wall and/or bottom of the main body of the furnace, a gas exhaust port provided in the upper side wall of the combustion chamber and the side wall of the upper portion of the furnace body, a duct connected to the gas exhaust port and adapted to guide an exhaust gas to a specific place of use, a means for controlling the amount of combustion air blown into the furnace, and an ash-take-off device.

DESCRIPTION OF THE PRESENT INVENTION

Since the incinerator in accordance with the present invention has a large furnace height, a drying zone, a quasi-combustion zone, and a combustion zone inside the furnace have sufficient heights, respectively, so that variations in the moisture content of objects to be incinerated is absorbed as very small variations within the scope of the height of the drying zone and the combustion zone, and a sufficient height is retained for the drying zone. Consequently, the objects to be incinerated are sufficiently dried within the time of their passage therethrough. Accordingly, the objects to be incinerated are burned out well without being affected by variations in the moisture content, and the combustion efficiency improves.

Since this incinerator has a plurality of air blast ports in the lower side wall of a combustion chamber and the amount of air blast is controlled adequately, the incinerator has the meritorious effect of increasing the combustion capability per unit area.

Furthermore, an exhaust gas which is discharged from a exhaust port provided at the upper side wall of the combustion chamber and the upper side wall of the furnace body is transferred to a desired place via a conduit (or a duct), thereby making it possible to secondarily make positive use of the same as a source for preliminarily drying and heating objects to be incinerated, a melting heat source, etc. therefor.

The height of a combustion layer can be controlled by withdrawing an exhaust gas from the upper side wall of the combustion chamber. At the same time, by making the thickness of a quasi-combustion layer where low temperature pyrolysis takes place, it is possible to substantially suppress the generation of nitrogen oxides, the amounts of final discharge determined by accelerated reaction of chlorine, sulfur, etc. with alkali, and the amount of accompanying dust.

Figure 1:
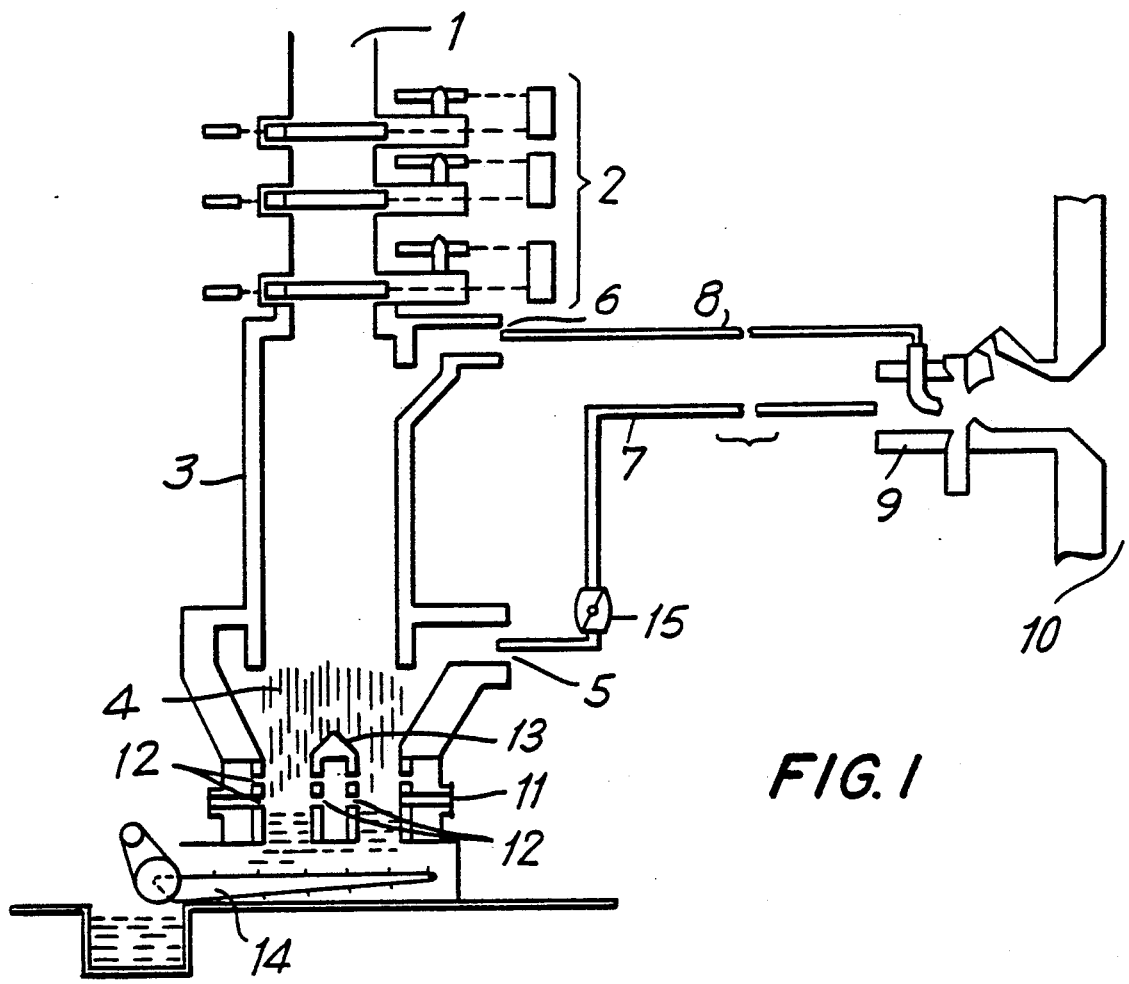
FIG. 1 is a vertical cross-sectional view of an incinerator in accordance with the present invention.

Referring initially to FIG. 1, FIG. 1 shows a vertical cross-sectional view of an embodiment of an incinerator in accordance with the present invention.

Reference numeral 1 denotes a hopper for charging objects to be incinerated, while numeral 2 denotes a known damper device, which is a three-stage damper in this case. Numeral 3 denotes a furnace body, which has a furnace height 1.5-10 times the average inner diameter of the furnace, and is provided with a discharge port 6 for an exhaust gas provided at the upper side wall thereof. Numeral 4 denotes a combustion chamber disposed at the lower portion of the body, and the combustion chamber has an exhaust port 5 for a combustion gas disposed at the upper side wall thereof. As shown in FIG. 1 the diameter of the combustion chamber 4 may be at least as large as the diameter of the furnace body 3. Numerals 7 and 8 are ducts which are respectively connected to the combustion gas exhaust port 5 and the exhaust gas discharge port 6 and are adapted to lead these exhaust gases to a specific place for secondary usage. Numeral 9 denotes a burner for burning the exhaust gases transferred via these ducts. The combustion gas burned by the burner is utilized secondarily as a source for preliminary drying and heating, a melting heat source, etc. in another furnace 10. Numeral 11 denotes an intake port for combustion air; 12, an air intake port; 13, a bank in a furnace; 14, an ash discharging device whose discharge speed is controllable; and 15, a damper. An air intake device, a flow rate control device and the like are connected to the air intake port 11 via ducts, and an exhaust gas blower is installed in the rear of the other furnace 10, but they are not shown.

Figure 2:
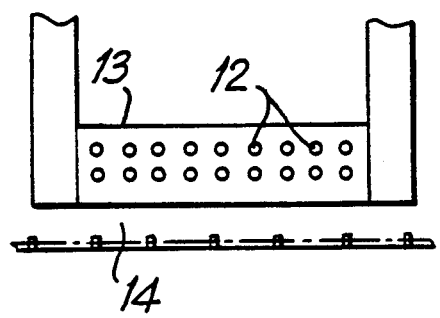
FIG. 2 shows a schematic cross-sectional view of an air blast port shown in FIG. 1.

FIG. 2 shows a schematic cross-sectional view of the air blast port of FIG. 1. In particular, bank 13, air intake ports 12 and ash discharging device 14 may be seen.

EXAMPLE

By using an incinerator in accordance with the present invention having a furnace height which is 2.5 times the average inner diameter of the furnace, bark of the moisture content of 47-71% was burned. Although in the case of a conventional fire grate-type furnace, the combustion rate was 100-120 l kg/m$^2$.h in terms of the moisture content, and the capacity combustion load was 25,000-40,000 kcal/m$^2$.h, whereas the respective values in this example were improved to 320-490 kg/m$^2$.h (at the time of temperature holding: 70 kg/cm$^2$.h) and 60,000-104,000 kcal/m$^2$.h.

An incinerator in accordance with the present invention is capable of burning at a high combustion efficiency objects to be incinerated which have large variations in the moisture content and heating value and in which nonflammable and flame-resisting objects are mixed, and, at the same time, is capable of making positive use of a generated exhaust gas secondarily Explanation of the Reference Numerals 1: hopper for charging objects to be incinerated
2: damper
3: furnace body
4: combustion chamber
5: exhaust port for combustion gas
6: discharge port for exhaust gas
7, 8: duct
9: burner
10: another furnace
11: combustion air intake port
12: air feeding port
13: bank in furnace body
14: ash take-off device
15: damper While the foregoing description and drawings represent the preferred embodiments of the present invention, it will be obvious to those skilled in the art that various changes and modifications may be made therein without departing from the true spirit and scope of the present invention.

What is claimed is:

1. An incinerator with high combustion rate for incinerating objects having a wide range of moisture content and heating value and in which non-flammable and flame-resistant objects may be mixed comprising: a furnace body having a height preselected to be from 1.5-10 times the average internal diameter thereof, a combustion chamber being formed in a lower portion of said furnace body and provided with a plurality of air blast ports in a lower side wall of said furnace body, said combustion chamber having a diameter at least as large as the diameter of the furnace body and including a central bank located at the bottom of the combustion chamber for providing further air blast ports, gas exhaust ports being provided in the upper side wall of said combustion chamber and the side wall of the upper portion of said furnace body respectively, means located at the bottom of said furnace body for providing rapid ash and cinder removal and at least one duct for leading an exhaust gas from said exhaust ports to a place for making secondary use thereof.

2. An incinerator according to claim 1, wherein said duct has means for controlling the flow rate of the exhaust gas.

3. An incinerator according to claim 1, wherein said incinerator is of a forced blast type in which the inside of said incinerator is filled with an object to be incinerated and means are included for controlling the combustion air and the exhaust gas of the entire system.

* * * * *